US011132647B1

(12) United States Patent
Shah et al.

(10) Patent No.: US 11,132,647 B1
(45) Date of Patent: Sep. 28, 2021

(54) CONVERTING ELECTRONIC MAIL TO TASKS (71) Applicant: Intuit Inc., Mountain View, CA (US)

(72) Inventors: Tejas Ranjit Shah, San Jose, CA (US); Ashwin Bharadwaj Lakshmi Venkataramanan, Santa Clara, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/037,298

(22) Filed: Sep. 29, 2020

(51) Int. Cl.
G06F 15/16 (2006.01)
G06Q 10/10 (2012.01)
H04L 12/58 (2006.01)

(52) U.S. Cl.
CPC ........... *G06Q 10/107* (2013.01); *H04L 51/12* (2013.01); *H04L 51/22* (2013.01); *H04L 51/28* (2013.01)

(58) Field of Classification Search
CPC ....... G06Q 10/107; H04L 51/12; H04L 51/22; H04L 51/28
USPC .......................................................... 709/206
See application file for complete search history.

(56) References Cited

U.S. PATENT DOCUMENTS

| 9,576,261 | B2* | 2/2017 | Thomas | G06Q 10/0633 |
|---|---|---|---|---|
| 9,959,037 | B2* | 5/2018 | Chaudhri | G06F 40/197 |
| 10,163,358 | B2* | 12/2018 | Yadav | G06Q 10/109 |
| 10,254,956 | B2* | 4/2019 | Chaudhri | G06F 3/04817 |
| 10,326,724 | B2* | 6/2019 | Bastide | H04L 51/18 |
| 10,331,336 | B2* | 6/2019 | Chaudhri | H04N 5/232933 |
| 10,346,635 | B2* | 7/2019 | Kumar | G06F 21/6245 |
| 10,356,031 | B2* | 7/2019 | Sachidanandam | G06Q 10/107 |
| 10,574,615 | B2* | 2/2020 | Sachidanandam | H04L 51/06 |
| 10,592,098 | B2* | 3/2020 | Chaudhri | G06F 3/0412 |
| 10,623,364 | B2* | 4/2020 | Dotan-Cohen | H04L 51/04 |
| 10,852,935 | B2* | 12/2020 | Chaudhri | H04L 51/046 |
| 2007/0282660 | A1* | 12/2007 | Forth | G06Q 10/10 705/7.15 |
| 2013/0346981 | A1* | 12/2013 | Johnson | G06Q 10/109 718/100 |
| 2017/0161372 | A1* | 6/2017 | Fern Ndez | G06F 40/268 |
| 2018/0052664 | A1* | 2/2018 | Zhang | G06F 16/90332 |
| 2018/0053119 | A1* | 2/2018 | Zeng | G06F 40/295 |
| 2018/0054464 | A1* | 2/2018 | Zhang | H04L 65/1096 |
| 2018/0054523 | A1* | 2/2018 | Zhang | G06N 5/04 |

OTHER PUBLICATIONS

"Email to Work—Implementation Details", https://asana.com/guide/help/email/email-to-asana, Aug. 5, 2020, 9 pages.

* cited by examiner

*Primary Examiner* — Alicia Baturay
(74) *Attorney, Agent, or Firm* — Ferguson Braswell Fraser Kubasta PC (57) ABSTRACT

A method may include creating a task inbox corresponding to an email address. The email address may include a domain name corresponding to a computer program. The method may further include receiving, at the task inbox, emails from agents of an organization. The agents may include an agent. The emails may include an email from the agent. The method may further include extracting, from the email, a verb, a due date, and a client, determining that the verb is an actionable verb, in response to determining that the verb is an actionable verb, generating, from the email and within the computer program, a task including the due date and the client, and assigning, in the computer program, the task to the agent.

20 Claims, 7 Drawing Sheets

CONVERTING ELECTRONIC MAIL TO TASKS

BACKGROUND

Organizations receive many task assignments from clients via electronic mail (e.g., email, text message, imessage, notification, etc.). Keeping track of client electronic mail and related tasks may be laborious and error-prone, potentially causing assigned tasks to be overlooked and/or missed task deadlines.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including creating a task inbox corresponding to an email address. The email address includes a domain name corresponding to a computer program. The method further includes receiving, at the task inbox, emails from agents of an organization. The agents include an agent. The emails include an email from the agent. The method further includes extracting, from the email, a verb, a due date, and a client, determining that the verb is an actionable verb, in response to determining that the verb is an actionable verb, generating, from the email and within the computer program, a task including the due date and the client, and assigning, in the computer program, the task to the agent.

In general, in one aspect, one or more embodiments relate to a system including an email delivery service configured to receive, at a task inbox corresponding to an email address, emails from agents of an organization. The agents include an agent. The emails include an email from the agent. The email address includes a domain name corresponding to a computer program. The system further includes an email-to-task converter configured to create the task inbox, extract, from the email, a verb, a due date, and a client, determine that the verb is an actionable verb, in response to determining that the verb is an actionable verb, generate, from the email and within the computer program, a task including the due date and the client, and assign, in the computer program, the task to the agent.

In general, in one aspect, one or more embodiments relate to a non-transitory computer readable medium including instructions that, when executed by a computer processor, perform creating a task inbox corresponding to an email address. The email address includes a domain name corresponding to a computer program. The instructions further perform receiving, at the task inbox, emails from agents of an organization. The agents include an agent. The emails include an email from the agent. The instructions further perform extracting, from the email, a verb, a due date, and a client, determining that the verb is an actionable verb, in response to determining that the verb is an actionable verb, generating, from the email and within the computer program, a task including the due date and the client, and assigning, in the computer program, the task to the agent.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Organizations receive many task assignments via electronic mail, including email. Tracking task-related client emails, assigning tasks received via email to specific individuals, and tracking task due dates may be laborious and complicated. As an example, specific individuals at a small business may be authorized to only work on specific projects or work for specific clients.

The disclosed invention provides a new capability for converting emails (or any other electronic mail) to tasks. As an example, emails may be forwarded by individuals in an organization to a task inbox. The task inbox may correspond to an email address that includes a domain name corresponding to a computer program in which users perform tasks (e.g., accounting tasks, computer programming tasks, etc.). For example, the task inbox may be addressed via an email address "tasks@programXYZ.com" and the computer program may correspond to a website with a domain name "programXYZ.com". A natural language processing (NLP) algorithm may be applied to determine the parts of speech (PoS) for the words in the forwarded email. Actionable verbs may be identified by querying a database of actionable verbs. For example, the database of actionable verbs may include verbs known to correspond to tasks performed by users in the computer program. The client and due date of the task may also be extracted from the forwarded email. A task including the due date and the client may be generated within the computer program. The task may then be assigned to a specific individual in the organization, for example, based on which individuals are authorized to work on projects for the client.

An automated capability to systematically convert emails to tasks and to determine which individuals to assign to the tasks may provide a competitive edge for providers of computer programs in which users perform tasks. As a result, user productivity may be improved, potentially resulting in increased product engagement, positive customer ratings, and an increased sales. Such a capability may be marketed as a productivity enhancement feature.

Figure 1A:
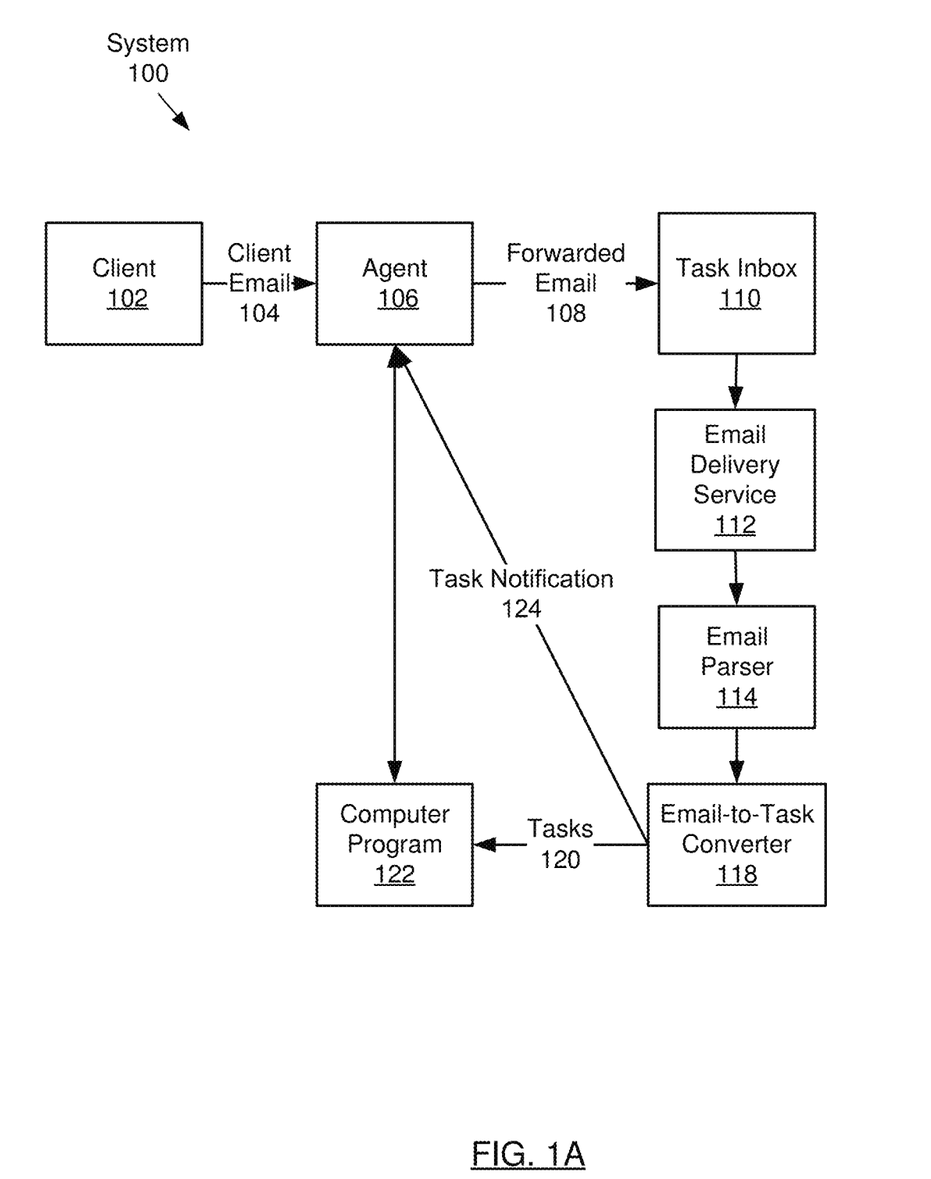
FIG. 1A and FIG. 1B show a system in accordance with one or more embodiments of the invention.

FIG. 1A shows a diagram of a system (100) in accordance with one or more embodiments. As shown in FIG. 1A, the system (100) includes multiple components such as a client (102), an agent (106), a task inbox (110), an email delivery service (112), an email parser (114), an email-to-task converter (118), and a computer program (122). Each of these components is described below.

A client (102) is any individual, business, or other entity who is a customer of an organization. For example, the organization may be an entity or portion of an entity that performs accounting functions for one or more clients. The client may have a name. The client name is an identifier of the client. For example, the client name may be the "doing business as" name, the incorporation name, or other name.

An agent (106) is an individual (e.g., employee, contractor) who performs tasks (120) for an organization. For example, the tasks (120) performed by the organization may be accounting tasks, such as managing cash flow, payroll, bookkeeping (e.g., maintaining accounting records), preparing and filing financial statements with one or more government and private entities, preparation and filing of tax related documents, auditing existing records, and/or performing other accounting tasks to monitor, analyze, report the finances of a client, or any combination thereof. The agent (106) may perform the tasks (120) in the computer program (122).

The computer program (122) may include a user interface (UI) (not shown) for receiving input from a user (e.g., an agent (106)) and transmitting output to the user. For example, the UI may be a graphical user interface or other user interface. The UI may be rendered and displayed within a local desktop software application or the UI may be generated by a remote web server and transmitted to a user's web browser executing locally on a desktop or mobile device.

An agent (106) has a role within the organization. The role defines the duties of the agent (106). For example, an agent (106) may be an owner. The owner is responsible for maintaining the organization. As another example, an agent (106) may be an accounting clerk. The accounting clerk may be responsible for recording financial transactions and performing clerical functions. An agent (106) may include functionality to generate financial reports, prepare and analyze budgets, perform bookkeeping, and perform other tasks. The agent (106) is responsible for ensuring the timely completion and accuracy of the tasks (120).

The agent(s) (106) and the client(s) (102) may be connected to a network. In particular, one or more of the various computing devices of the agent(s) (106) and the client(s) (102) may be communicatively connected, temporarily or permanently, to network. For example, the network may be any interconnection of devices that is configured to transmit communications between various endpoints (e.g., client(s) (102), agent(s) (106)).

An agent (106) may include functionality to receive a client email (104) from a client (102). The client email (104) may describe one or more tasks (120) to be performed for the client (102). The agent (106) may include functionality to send a forwarded email (108) that includes the client email (104) to the task inbox (110).

Figure 1B:
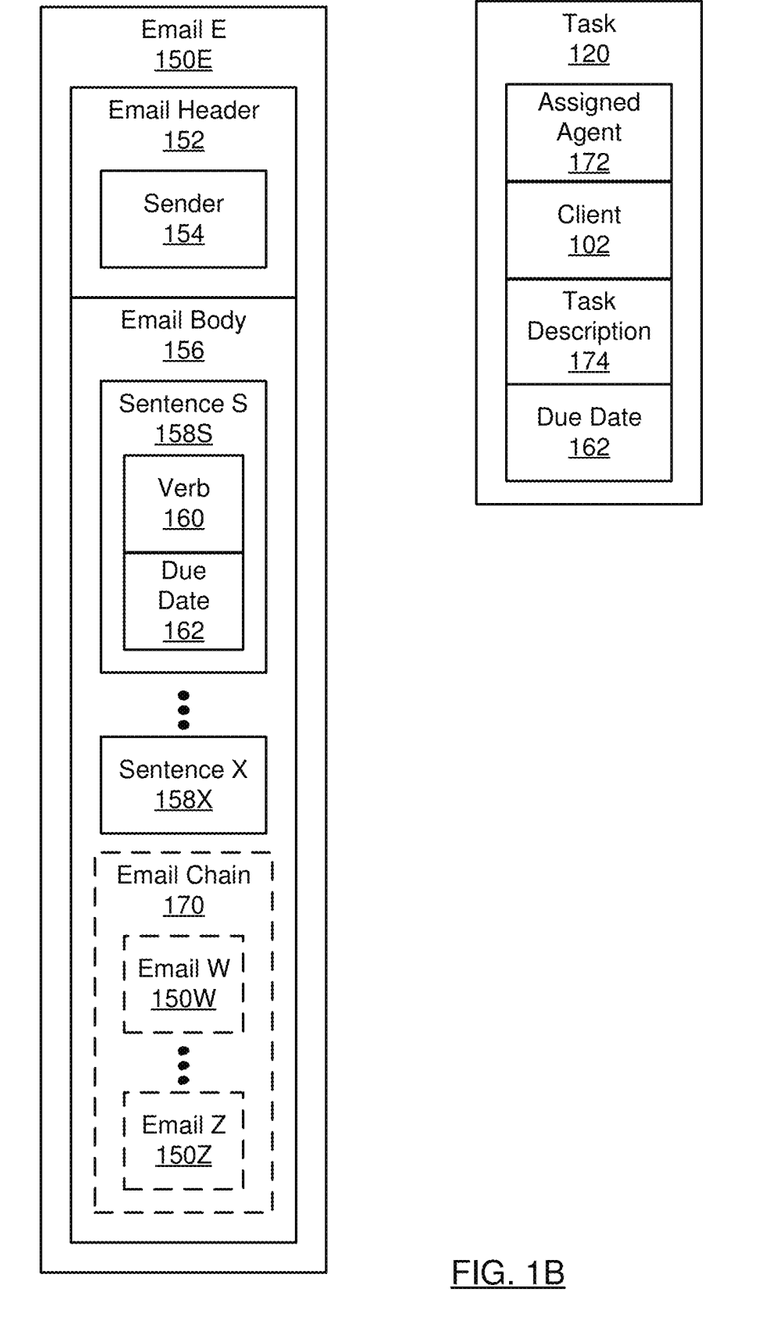

Turning to FIG. 1B, an email (150E) includes an email header (152) and an email body (156). The email header (152) may include a sender (154), a subject, a date, etc. For example, the sender (154) of the client email (104) may be the client (102) and the sender (154) of the forwarded email (108) may be the agent (106). The email body (156) may include one or more sentences (154S, 154X) and optionally, an email chain (170). The email chain (170) may include a series of one or more emails (150W, 150Z). For example, each email in the email chain (170) may be a reply or a forwarded email. Each sentence (158S) may include a verb (160) and a due date (162). The verb (160) is a word or phrase that indicates an action (e.g., ship, pay, produce, etc.). In one or more embodiments, a verb (160) is an actionable verb included in a database of actionable verbs known to correspond to tasks (120). For example, the database of actionable verbs may be specific to tasks (120) performed in the computer program (122). Continuing this example, the computer program (122) may be an accounting program and the actionable verbs may correspond to accounting tasks performed by users (e.g., agent(s) (106)) in the computer program (122). Further continuing this example, the database of actionable verbs may include common misspellings of the actionable verbs. The due date (162) is the date at which a task (120) corresponding to the email (150E) should be or is required to be completed.

Returning to FIG. 1A, in one or more embodiments, the task inbox (110) is an email account corresponding to an email address that includes a domain name corresponding to the computer program (122). For example, the computer program (122) may correspond to a website with a domain name "programXYZ.com" and the task inbox (110) may correspond to (e.g., be addressed by) an email address "tasks @programXYZ.com". Continuing this example, the Uniform Resource Locator (URL) of the website of the computer program (122) may be "www.programXYZ.com". The task inbox (110) may correspond to a portion of memory of the email delivery service (112). For example, emails received at the task inbox (110) may be stored in the portion of memory. The task inbox (110) may function as a repository that accumulates forwarded emails (108) sent by multiple agents (106).

Figure 3:
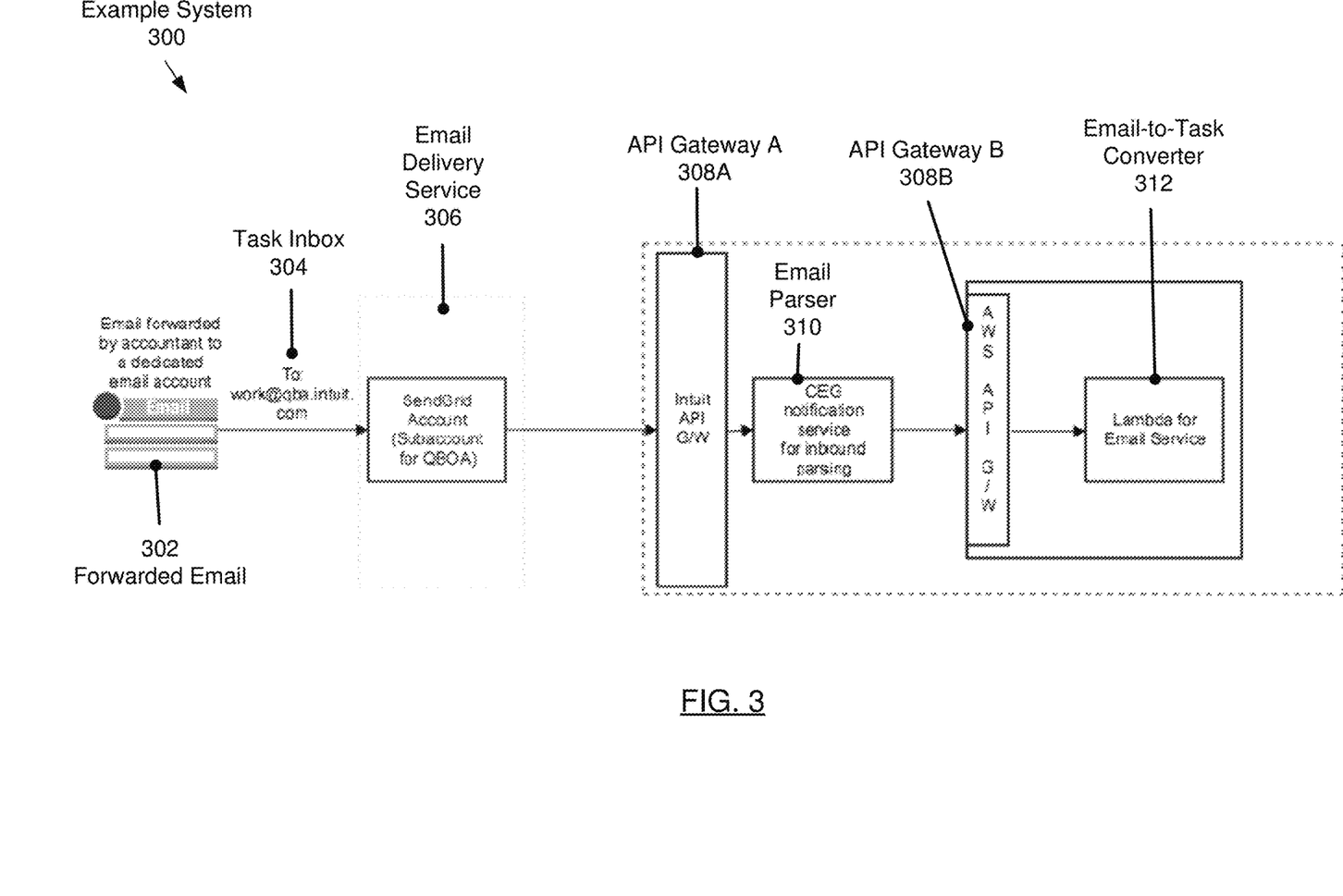
FIG. 3, FIG. 4A, and FIG. 4B show examples in accordance with one or more embodiments of the invention.
Figure 5A:
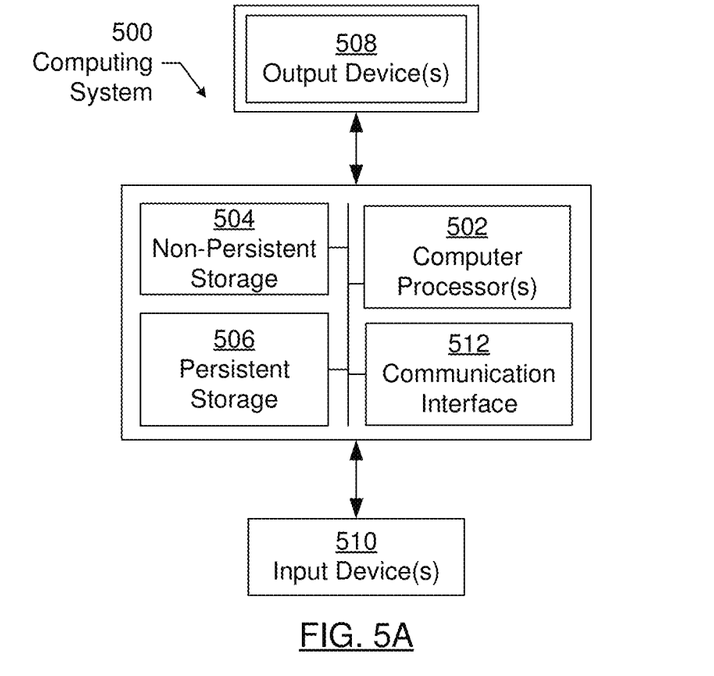
FIG. 5A and FIG. 5B show computing systems in accordance with one or more embodiments of the invention.
Figure 5B:
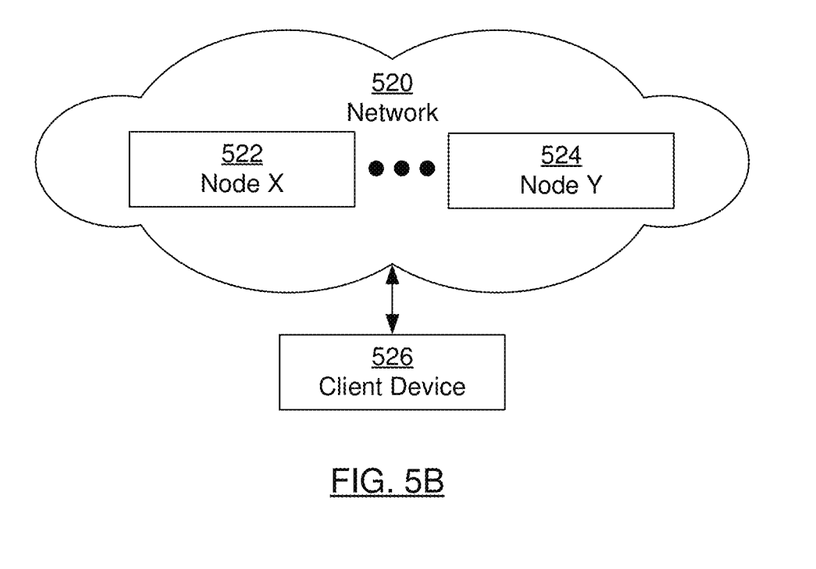

The email delivery service (112) may be executed on a computing system (e.g., the computing system (500) of FIG. 5A) connected to a network (e.g., the network (520) as shown in FIG. 5B). The email delivery service (112) includes functionality to receive emails. The emails may include forwarded emails (108) received at the task inbox (110). The email delivery service (112) includes functionality to validate an email (150E). For example, the email delivery service (112) may include functionality to validate that the sender (154) in an email header (152) corresponds to a valid email account. As another example, the email delivery service (112) may include functionality to validate a digital signature of an email (150E). As yet another example, the email delivery service (112) may include functionality to determine whether an email (150E) is spam (e.g., junk mail). The email delivery service (112) includes functionality to send emails to the email parser (114). In one or more embodiments, the email delivery service (112) includes functionality to send emails to the email parser (114) by invoking a webhook exposed by the email parser (114), as described below. A webhook is an Hypertext Transfer Protocol (HTTP) callback that may be triggered by an event. In this case, the event is the receipt of the emails. For example, the webhook may be exposed at an application programming interface (API) gateway (308A) used by the email parser (310), as shown in FIG. 3. An API gateway may be a management tool that interfaces between requestors of services and providers of services.

The email parser (114) may be executed on a computing system (e.g., the computing system (500) of FIG. 5A) connected to a network. The email parser (114) includes functionality to receive emails from the email delivery service (112). The email parser (114) may include functionality to convert a batch of emails received from the email delivery service (112) into individual emails. The email parser (114) includes functionality to send individual emails to the email-to-task converter (118). The email parser (114) may include functionality to convert the individual emails into a specific format (e.g., JavaScript Object Notation (JSON)) before sending the emails to the email-to-task converter (118).

In one or more embodiments, the email parser (114) includes functionality to receive emails from the email delivery service (112) via a webhook. The webhook may perform various functions. For example, the webhook may authenticate (e.g., to avoid a spoofing attack) an incoming HTTP post request from the email delivery service (112). Continuing this example, the webhook may authenticate the incoming HTTP post request using a whitelist that includes a list of IP addresses (e.g., an IP address of the email delivery service (112)), email addresses (e.g., an email address corresponding to the task inbox (110)), domain names (e.g., a domain name included in an email address corresponding to the task inbox (110)), sub-domain names and/or other identifying information of trusted sources. In one or more embodiments, the email parser (114) includes functionality to send emails to the email-to-task converter (118) by invoking a webhook exposed by the email-to-task converter (118), as described below.

The email-to-task converter (118) may be executed on a computing system (500) shown in FIG. 5A connected to a network (520) as shown in FIG. 5B. The email-to-task converter (118) includes functionality to generate a task (120) from an email (150E). The email-to-task converter (118) may generate the task (120) within the computer program (122). Returning to FIG. 1B, the task (120) includes an assigned agent (172), a client (102), a task description (174) and a due date (162). The assigned agent (172) is the agent to which the task (160) is assigned (see description of Step 212 below). The assigned agent (172) may be the same as the sender (154) of the email (150E). For example, the assigned agent (172) may be the agent (106) who sent the forwarded email (108). Alternatively, the assigned agent (172) and the sender (154) of the email (150E) may be different. For example, the assigned agent (172) may be another agent working for the same organization as the agent (106) who sent the forwarded email (108). The task description (174) is a description of the task (120). For example, the task description (174) may be a sentence (158S) that includes a verb (160) found in a database of actionable verbs. Alternatively, the task description (174) may be a portion (e.g., a summary) of the sentence (158S) that includes the verb (160). The task (120) may be included in a project for the client (102). For example, the project may be assigned to an organization that includes the assigned agent (172).

In one or more embodiments, the email-to-task converter (118) includes functionality to receive emails from the email parser (114) using a webhook. For example, the webhook may be exposed at an API gateway (308B) used by the email-to-task converter (312), as shown in FIG. 3. The webhook may authenticate an incoming HTTP post request from the email parser (114). For example, the webhook may authenticate an incoming HTTP post request from the email parser (114) using a whitelist. Continuing this example, the whitelist may include an IP address of the email parser (114). As another example, the webhook may include functionality to authenticate an incoming request from the email parser (114) by validating an API key in the header of the request. An API key may be an encrypted string that identifies a caller (e.g., a computer program) of the API. The email-to-task converter (118) includes functionality to send a task notification (124) including a task (120) to an agent (106).

While FIG. 1A shows a configuration of components, other configurations may be used without departing from the scope of the invention. For example, various components may be combined to create a single component. As another example, the functionality performed by a single component may be performed by two or more components.

Figure 2:
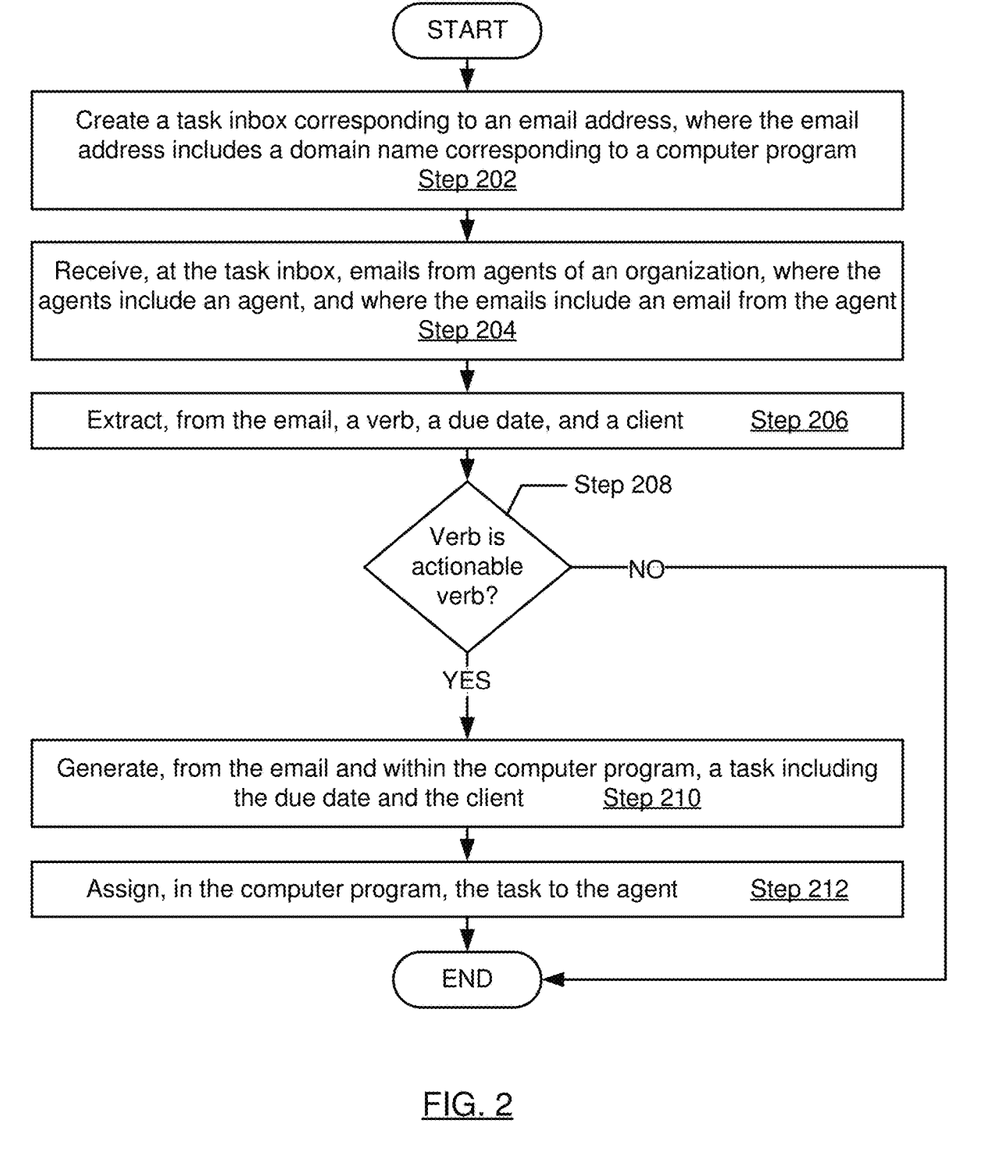
FIG. 2 shows a flowchart in accordance with one or more embodiments of the invention.

FIG. 2 shows a flowchart in accordance with one or more embodiments of the invention. The flowchart depicts a process for converting an email to a task. One or more of the steps in FIG. 2 may be performed by the components (e.g., the email-to-task converter (118), the email parser (114), and the email delivery service (112)) discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, a task inbox corresponding to an email address is created. The task inbox may be an email account corresponding to the email address. The email address may include a domain name corresponding to a computer program. For example, the task inbox may be addressed via an email address "tasks@programXYZ.com" and the computer program may correspond to a website with a domain name "programXYZ.com". The task inbox may be created by the email-to-task converter.

In Step 204, emails are received, at the task inbox, from agents of an organization. The emails include an email from an agent. The email may be a forwarded email sent by the agent, in which case the agent may be referred to as the forwarding agent. The email delivery service may authenticate the emails by validating the domain name included in the email address corresponding to the task inbox. For example, the email delivery service may add the domain name to a whitelist used by the email delivery service.

In one or more embodiments, the email delivery service applies the Sender Policy Framework (SPF) to detect forged email addresses by checking whether an email claiming to come from a specific domain is submitted by an Internet Protocol (IP) address authorized by an administrator of the domain. In one or more embodiments, the email delivery service calculates a spam score for a received email. If the spam score is within a predefined threshold, then the received email may be considered valid (i.e., not spam). In one or more embodiments, the email delivery service validates a digital signature of a received email. For example, the digital signature may be placed on the email by the DomainKeys Identified Mail (DKIM) email authentication method.

In Step 206, a verb, a due date, and a client are extracted from the email. In one or more embodiments, the email-to-task converter extracts an email header and an email body from the email. Alternatively, the email header and the email body may be extracted from the email by the email parser. The email may be a forwarded email whose email body includes a client email. The client may be the sender of the client email. The email-to-task converter may extract the due date from the email body. For example, the due date may be extracted from the email body using a natural language date parser, such as the Natty Date Parser.

The email-to-task converter may extract one or more emails (e.g., in an email chain) from the email body. For example, the one or more emails may be extracted from the email body using a pattern matching algorithm. The email-to-task converter may divide each email into one or more sentences. A natural language processing (NLP) algorithm may be applied to determine parts of speech (PoS) for the words (e.g., tokens) in each sentence. The email-to-task converter may extract a verb from each sentence. For example, the verb may be a verb that is not preceded by one of the following question words: "who", "what", "why", "where", "which", "when", "how", etc. That is, a verb preceded by one of the question words may be an irrelevant task (i.e., a task not performed in the computer program).

If, in Step 208 it is determined that the verb is an actionable verb, then Step 210 and Step 212 below are executed. The email-to-task converter may determine that the verb is an actionable verb by querying a database of actionable verbs with the verb. For example, the database of actionable verbs may include verbs known to correspond to tasks performed by users in the computer program.

In Step 210, a task including the due date and the client is generated, within the computer program, from the email. The email-to-task converter may generate the task within the computer program. The task may include a task description. For example, the task description may be a sentence of the email that includes the verb.

In Step 212, the task is assigned, in the computer program, to the agent. The email-to-task converter may assign the task to the agent based on a prior interaction between the agent and the client. For example, the forwarding agent may already be assigned to a project for the client. Continuing this example, a database may include a listing of the organizations and/or agents that have permission to work on projects and/or tasks for various clients. Further continuing this example, the database may be included within the computer program, or may be external to the computer program.

Figure 4A:
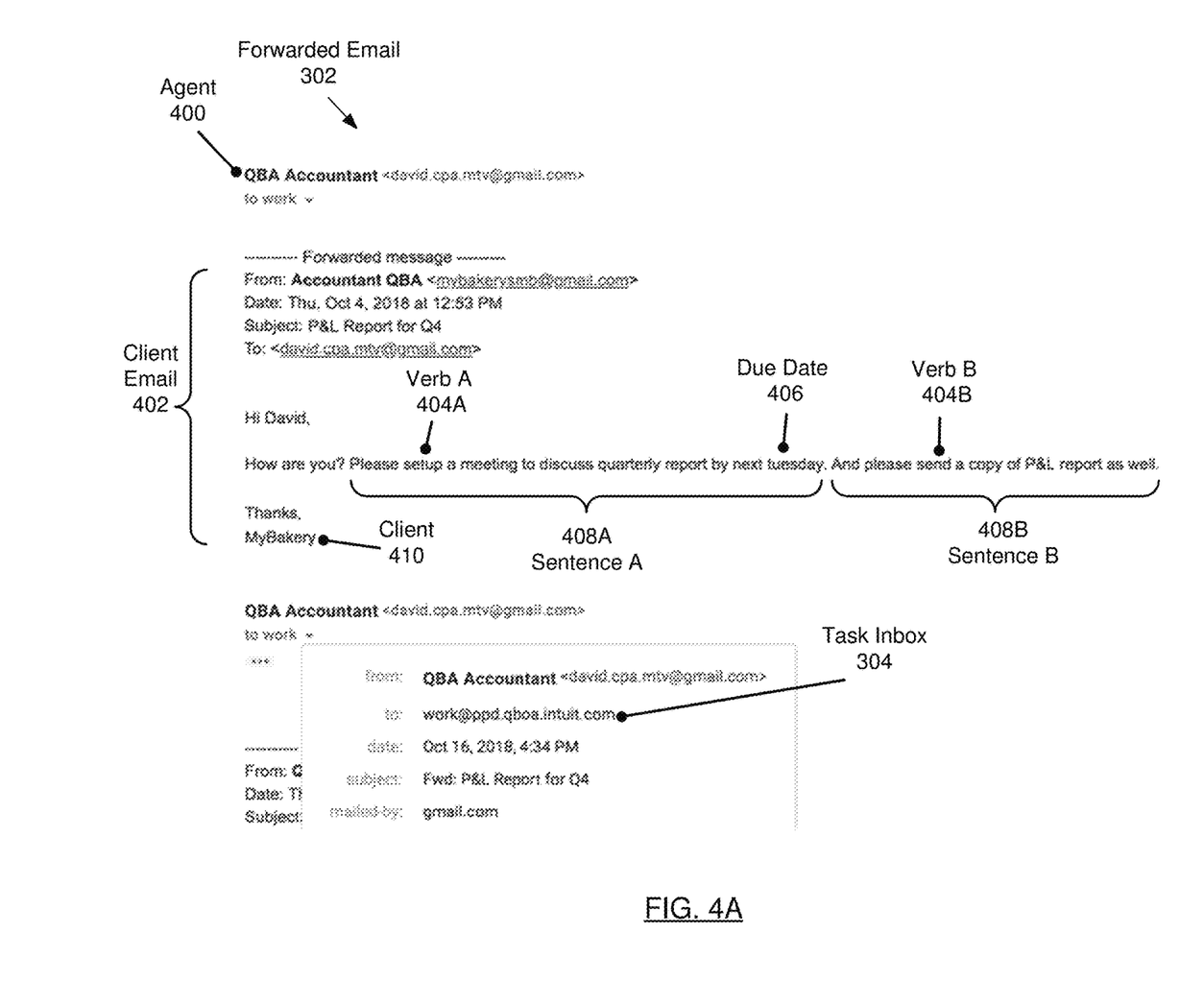
Figure 4B:
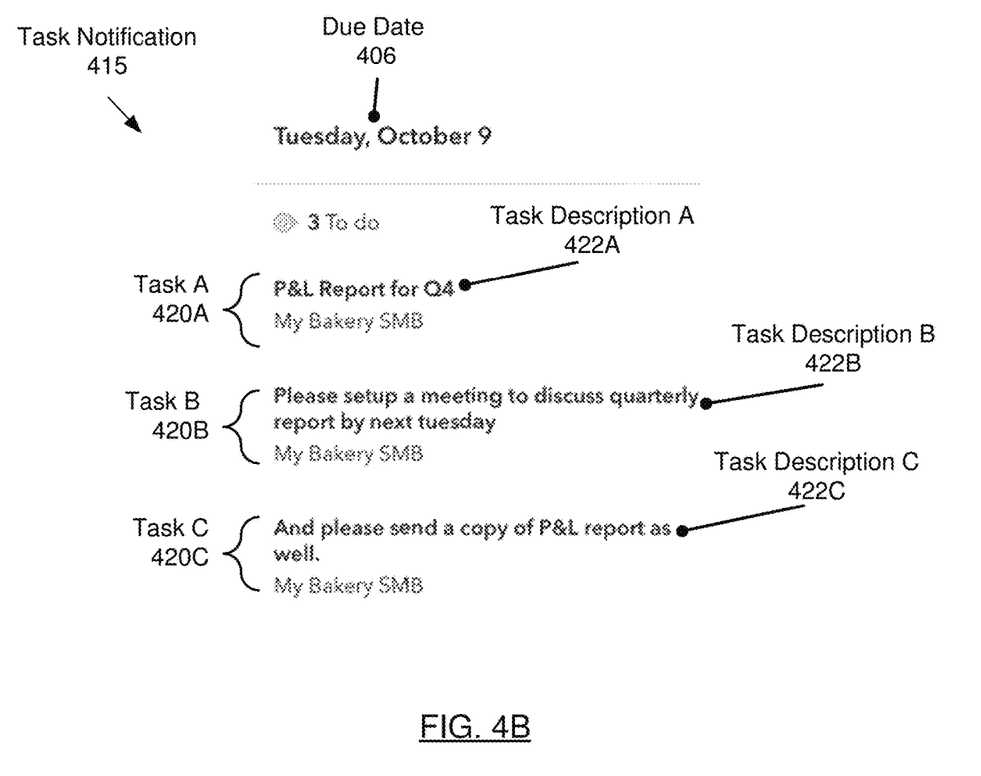

The email-to-task converter may send, to the agent, a task notification including the task. The task notification may be sent via email. Alternatively or additionally, the task notification may be sent as a calendar entry in a calendar system of the agent, as shown in FIG. 4B.

Alternatively, the forwarding agent may lack permission to work on a task for the client, in which case the email-to-task converter may assign the task to a different agent who has permission to work on a task for the client. For example, the email-to-task converter may assign the task to a different agent who works in the same organization as the forwarding agent. Continuing this example, the different agent may be an agent mentioned in the forwarded email (e.g., in an email chain included in the forwarded email). As another example, the different agent may be an administrative agent who works in the same organization as the forwarding agent.

In an alternative scenario, the forwarding agent may have permission to work on a task for the client, but a project has not been assigned to the organization that includes the forwarding agent. In this alternative scenario, the email-to-task converter may first generate (e.g., within the computer program) a project, then assign the project to the organization that includes the forwarding agent, and finally assign the task to the forwarding agent.

The following example is for explanatory purposes only and not intended to limit the scope of the invention. FIG. 3, FIG. 4A, and FIG. 4B show an implementation example in accordance with one or more embodiments of the invention. FIG. 3 shows an example system (300) that includes a flow from a forwarded email (302) ((108) in FIG. 1A), to a task inbox (304) ((110) in FIG. 1A), an email delivery service (306) ((112) in FIG. 1A), an email parser (310) ((114) in FIG. 1A), and an email-to-task converter (312) ((118) in FIG. 1A). The forwarded email (302) includes a client email (402) ((104) in FIG. 1A), as shown in FIG. 4A. The client email (402) is sent by a client "MyBakery" (410) ((102) in FIG. 1A). The forwarded email (302) is sent by an agent "QBA Accountant" (400) ((106) in FIG. 1A) to the task inbox (304) in order to have the email-to-task converter (310) generate and assign tasks corresponding to the client email (402) within a computer program, in this case, QuickBooks Online Accountant (QBOA). The agent (400) sends the forwarded email (302) to the task inbox (304) using the email address work@qba.intuit.com, which includes a domain name "qba.intuit.com" corresponding to the computer program.

The email delivery service (306) receives the forwarded email (302) at the task inbox (304). The email delivery service (306) validates that the email address of the agent (400) corresponds to a valid email account. The email delivery service (306) also validates a digital signature of the forwarded email (302) and determines that a spam score of the forwarded email (302) is within a spam threshold. After validating the forwarded email (302), the email delivery service (306) sends the forwarded email (302) to the email parser (310) as part of a batch of emails. The email delivery service (306) sends the batch of emails to the email parser (310) by invoking a webhook exposed at an application programming interface (API) gateway (308A) used by the email parser (310). The webhook authenticates an incoming Hypertext Transfer Protocol (HTTP) post request from the email delivery service (306) using a whitelist that includes an Internet Protocol (IP) address of the email delivery service (306).

The email parser (310) converts the batch of emails received from the email delivery service (306) into individual emails, one of which is the forwarded email (302). The email parser (310) sends the forwarded email (302) to the email-to-task converter (312). Prior to sending the forwarded email (302) to the email-to-task converter (312) the email parser (310) converts the forwarded email (302) to JavaScript Object Notation (JSON). The email parser (310) sends the forwarded email (302) to the email-to-task converter (312) by invoking a webhook exposed at an API gateway (308B) used by the email-to-task converter (312).

The email-to-task converter (312) divides the forwarded email (302) into sentences (408A, 408B). Sentence (408A) includes the verb "setup" and sentence (408B) includes the verb "send", both of which are actionable verbs included in a database of actionable verbs known to correspond to tasks (120) performed by users of QBOA. In contrast, the email-to-task converter (312) ignores the first sentence "How are you" in the forwarded email (302) because the first sentence does not include an actionable verb included in the database of actionable verbs. The email-to-task converter (312) also extracts the client (410) and the due date (406) from the forwarded email (302).

As shown in FIG. 4B, the email-to-task converter (312) generates, within QBOA, task B (420B) including task description B (422B), which is extracted from sentence A (408A). Similarly, the email-to-task converter (312) generates task C (420C) including task description C (422C), which is extracted from sentence B (408B). In addition, the email-to-task converter (312) generates task A (420A) including task description A (422A) because the email-to-task converter (312) determines (e.g., by querying a repository of QBOA reports) that the P&L report referred to in task description B (422B) needed to be obtained.

The email-to-task converter (312) assigns the tasks (420A, 420B, 420C) to the agent (400) because the email-to-task converter (312) determines that the agent (400) is already assigned to a project in QBOA for the client (410). The email-to-task converter (312) sends, to the agent (400), a task notification (415) that includes tasks (420A, 420B, 420C) as an online calendar entry.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   creating a task inbox corresponding to an email address, wherein the email address comprises a domain name corresponding to a computer program;
   receiving, at the task inbox, a plurality of emails from a plurality of agents of an organization,
      wherein the plurality of agents comprises a first agent, and
      wherein the plurality of emails comprises a first email from the first agent;
   extracting, from the first email, a first verb, a first due date, and a client;
   determining that the first verb is an actionable verb;
   in response to determining that the first verb is an actionable verb, generating, from the first email and within the computer program, a first task comprising the first due date and the client; and
   assigning, in the computer program, the first task to the first agent.

2. The method of claim 1, further comprising:
   adding, to a whitelist, the domain name corresponding to the computer program; and
   in response to receiving the plurality of emails, authenticating, using the whitelist, the plurality of emails, wherein the determining step is performed in response to the authenticating.

3. The method of claim 1, further comprising:
   dividing the first email into a plurality of sentences comprising a first sentence and a second sentence;
   extracting, from the second sentence, a second verb and a second due date;
   determining that the second verb is an actionable verb;
   in response to determining that the second verb is an actionable verb, generating, from the second sentence and within the computer program, a second task comprising the second due date and the client; and
   assigning, in the computer program, the second task to the first agent.

4. The method of claim 1, further comprising:
   determining that the first agent has access to a project for the client, wherein assigning the first task to the first agent is based on determining that the first agent has access to the project.

5. The method of claim 4, wherein the plurality of emails further comprises a second email from a second agent of the plurality of agents, and wherein the organization is assigned to the project for the client, the method further comprising:
   extracting, from the second email, a second verb, a second due date, and the client;
   determining that the second verb is an actionable verb;
   in response to determining that the second verb is an actionable verb, generating, from the second email and within the computer program, a second task comprising the second due date and the client;
   determining that the second agent lacks access to the project; and
   in response to determining that the second agent lacks access to the project, assigning, in the computer program, the second task to a third agent of the organization, wherein the third agent has access to the project.

6. The method of claim 1, further comprising:
   determining that the organization lacks an assignment to a project for the client; and
   in response to determining that the organization lacks an assignment to a project for the client:
      generating, within the computer program, a project for the client comprising the first task, and
      assigning, in the computer program, the project to the organization.

7. The method of claim 1, wherein the first email is validated by:
   calculating a spam score for the first email;
   determining that the spam score is within a threshold; and
   validating a digital signature of the first email.

8. A system comprising:
   a computer processor;
   a memory;
   an email delivery service configured to receive, at a task inbox corresponding to an email address, a plurality of emails from a plurality of agents of an organization,
      wherein the plurality of agents comprises a first agent,
      wherein the plurality of emails comprises a first email from the first agent, and
      wherein the email address comprises a domain name corresponding to a computer program; and
   an email-to-task converter executing on the computer processor and using the memory,
      wherein the email-to-task converter is configured to:
         create the task inbox, extract, from the first email, a first verb, a first due date, and a client, determine that the first verb is an actionable verb, in response to determining that the first verb is an actionable verb, generate, from the first email and within the computer program, a first task comprising the first due date and the client, and assign, in the computer program, the first task to the first agent.

9. The system of claim 8, further comprising an email parser configured to:

add, to a whitelist, the domain name corresponding to the computer program, receive the plurality of emails from the email service, and in response to receiving the plurality of emails, authenticate, using the whitelist, the plurality of emails, wherein determining that the first verb is an actionable verb is performed in response to authenticating the plurality of emails.

10. The system of claim 8, wherein the email-to-task converter is further configured to:

divide the first email into a plurality of sentences comprising a first sentence and a second sentence;

extract, from the second sentence, a second verb and a second due date;

determine that the second verb is an actionable verb;

in response to determining that the second verb is an actionable verb, generate, from the second sentence and within the computer program, a second task comprising the second due date and the client; and assign, in the computer program, the second task to the first agent.

11. The system of claim 8, wherein the email-to-task converter is further configured to:

determine that the first agent has access to a project for the client, wherein assigning the first task to the first agent is based on determining that the first agent has access to the project.

12. The system of claim 11, wherein the plurality of emails further comprises a second email from a second agent of the plurality of agents, wherein the organization is assigned to the project for the client, and wherein the email-to-task converter is further configured to:

extract, from the second email, a second verb, a second due date, and the client;

determine that the second verb is an actionable verb;

in response to determining that the second verb is an actionable verb, generate, from the second email and within the computer program, a second task comprising the second due date and the client;

determine that the second agent lacks access to the project; and in response to determining that the second agent lacks access to the project, assign, in the computer program, the second task to a third agent of the organization, wherein the third agent has access to the project.

13. The system of claim 8, wherein the email-to-task converter is further configured to:

determine that the organization lacks an assignment to a project for the client; and in response to determining that the organization lacks an assignment to a project for the client:

generate, within the computer program, a project for the client comprising the first task, and assign, in the computer program, the project to the organization.

14. The system of claim 8, wherein the email service is further configured to validate the first email by:

calculating a spam score for the first email, determining that the spam score is within a threshold, and validating a digital signature of the first email.

15. A non-transitory computer readable medium comprising instructions that, when executed by a computer processor, perform:

creating a task inbox corresponding to an email address, wherein the email address comprises a domain name corresponding to a computer program;

receiving, at the task inbox, a plurality of emails from a plurality of agents of an organization, wherein the plurality of agents comprises a first agent, and wherein the plurality of emails comprises a first email from the first agent;

extracting, from the first email, a first verb, a first due date, and a client;

determining that the first verb is an actionable verb;

in response to determining that the first verb is an actionable verb, generating, from the first email and within the computer program, a first task comprising the first due date and the client; and assigning, in the computer program, the first task to the first agent.

16. The non-transitory computer readable medium of claim 15, wherein the instructions further perform:

adding, to a whitelist, the domain name corresponding to the computer program; and in response to receiving the plurality of emails, authenticating, using the whitelist, the plurality of emails, wherein the determining step is performed in response to the authenticating.

17. The non-transitory computer readable medium of claim 15, wherein the instructions further perform:

dividing the first email into a plurality of sentences comprising a first sentence and a second sentence;

extracting, from the second sentence, a second verb and a second due date;

determining that the second verb is an actionable verb;

in response to determining that the second verb is an actionable verb, generating, from the second sentence and within the computer program, a second task comprising the second due date and the client; and assigning, in the computer program, the second task to the first agent.

18. The non-transitory computer readable medium of claim 15, wherein the instructions further perform:

determining that the first agent has access to a project for the client, wherein assigning the first task to the first agent is based on determining that the first agent has access to the project.

19. The non-transitory computer readable medium of claim 18, wherein the plurality of emails further comprises a second email from a second agent of the plurality of agents, wherein the organization is assigned to the project for the client, and wherein the instructions further perform:

extracting, from the second email, a second verb, a second due date, and the client;

determining that the second verb is an actionable verb;

in response to determining that the second verb is an actionable verb, generating, from the second email and within the computer program, a second task comprising the second due date and the client;

determining that the second agent lacks access to the project; and in response to determining that the second agent lacks access to the project, assigning, in the computer program, the second task to a third agent of the organization, wherein the third agent has access to the project.

20. The non-transitory computer readable medium of claim 15, wherein the instructions further perform:
   determining that the organization lacks an assignment to a project for the client; and
   in response to determining that the organization lacks an assignment to a project for the client:
      generating, within the computer program, a project for the client comprising the first task, and
      assigning, in the computer program, the project to the organization.

* * * * *